Dec. 16, 1941.      D. W. SHERMAN      2,266,280
REAR WHEEL SUSPENSION FOR AUTOMOBILES
Filed Oct. 31, 1940
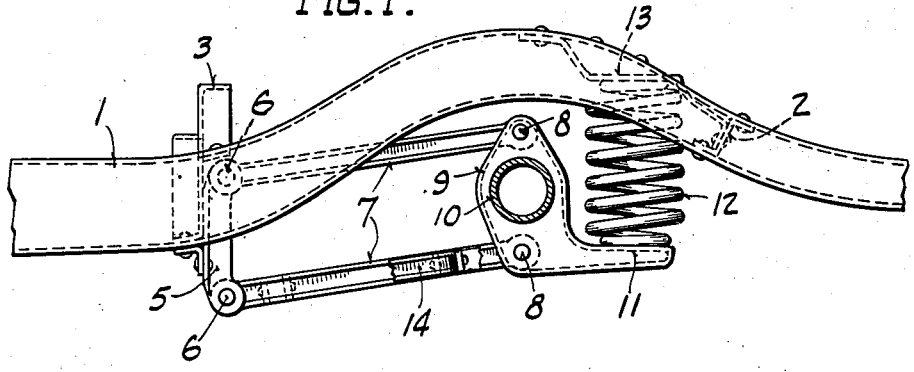
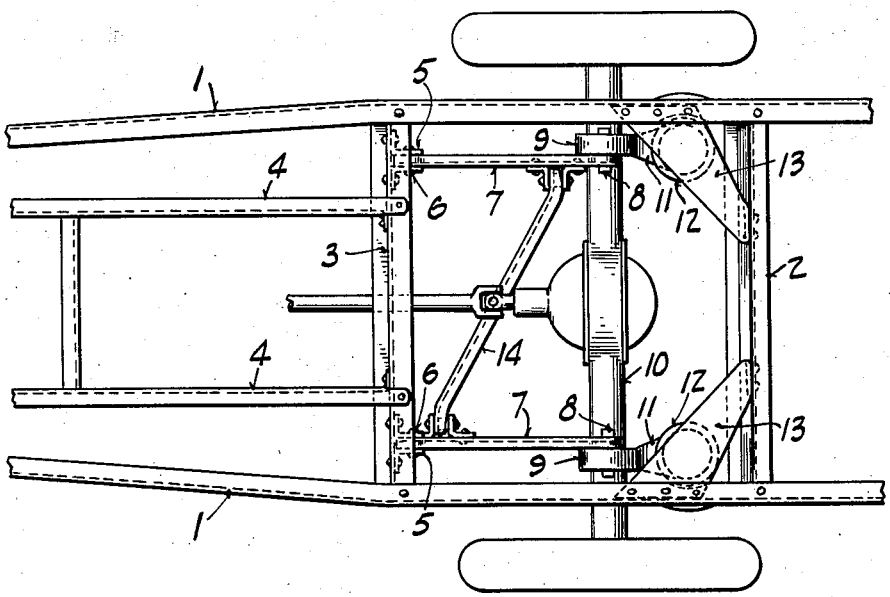
Donald W. Sherman
INVENTOR.
BY
ATTORNEY.

Patented Dec. 16, 1941

2,266,280

UNITED STATES PATENT OFFICE 2,266,280

REAR WHEEL SUSPENSION FOR AUTOMOBILES

Donald W. Sherman, Shorewood, Wis., assignor to A. O. Smith Corporation, Milwaukee, Wis., a corporation of New York Application October 31, 1940, Serial No. 363,648

4 Claims. (Cl. 267—20)

This invention relates to a rear wheel suspension for motor vehicles.

An object of the invention is to provide an improved rear wheel suspension which can be readily and cheaply fabricated from a small number of parts.

A further object of the invention is to provide an improved rear wheel suspension adapted for use with coil springs.

These and other objects of the invention will be clear from the following detailed description and the accompanying drawing in which:

Figure 1 is a side elevation of the rear portion of an automobile frame and the improved rear wheel suspension of this invention; and Fig. 2 is a top plan view.

The frame of the vehicle to which the suspension is applied may consist of side rails 1, cross members 2 and 3 and longitudinal members 4 which are connected to cross member 3 and extend forward therefrom. It is to be understood, however, that the frame shown in the drawing is illustrative only, and that the rear wheel suspension of this invention is usable with other types of vehicle frames as well.

Two brackets 5 which, in the type of frame illustrated, may conveniently be fixed to cross member 3, are provided with pivotal connections 6 for the attachment of the forward ends of a pair of parallel links 7. The links are preferably of pressed steel shaped into light and rigid members.

The rear ends of the links 7 are pivotally connected at 8 to brackets 9 which are secured to the rear axle 10. Each bracket has a spring seat 11 for a spring 12, the other end of which is seated against spring seat 13 secured to the automobile frame. As the rear axle moves up and down in response to road shocks, the brackets 9 are constantly maintained parallel to their original position by means of the two pairs of parallel links 7 and the spring seats 11 are held in parallelism with spring seats 13. This results in substantially equal compression on both sides of spring 12.

To assure lateral positioning of the rear axle with respect to the car, a stabilizer rod 14 is provided which runs diagonally across the car from one link near its attachment to the frame to the corresponding link on the opposite side of the car near its attachment to the rear axle. The stabilizer rod is pivotally connected to the links at its extremities and may be attached to either the upper or lower links depending upon which is most convenient from the standpoint of freedom from interference with other parts of the car.

The invention is claimed as follows:

1. In an automobile, a rear wheel suspension comprising two pairs of substantially parallel links in two substantially vertical planes near the ends of the rear axle, a pivotal connection between the front end of each link and the frame of the car, a pivotal connection between the rear end of each link and the rear axle, a stabilizer rod running from one link of a pair near its attachment to the frame to the corresponding link of the other pair near its attachment to the rear axle, and coil springs to provide resilience between the rear axle and the frame of the car.

2. In an automobile, a rear wheel suspension comprising a bracket secured to the rear axle near each end, a spring seat on the bracket, a coil spring on the spring seat with its other end abutting against a spring seat on the frame, a pair of substantially parallel links at each bracket disposed with one link substantially vertically over the other, a pivotal connection between the front end of each link and the frame, a pivotal connection between the rear end of each link and the bracket on the rear axle, and a stabilizer rod pivotally connected to one link near its connection to the frame and extending diagonally across the car to a pivotal connection to another link near its attachment to the bracket on the rear axle.

3. In an automobile, in combination with a spring suspension employing a spring for the axle adjacent each end thereof, a pair of parallel links at each spring disposed with the links in a vertical plane and in which the links are pivoted at one end to the frame of the automobile and at the other end to the axle, a cross tie extending diagonally between the two pairs of links and having one end pivoted to one link near its attachment to the frame and on an axis substantially parallel to the link and having the other end pivoted to one link of the other pair near its attachment to the axle and on an axis substantially parallel to the link.

4. In an automobile, in combination with a spring suspension employing a spring for the axle adjacent each end thereof, a pair of parallel links at each spring disposed with the links in a vertical plane and in which the links are pivoted at one end to the frame of the automobile and at the other end to the axle, a cross tie extending diagonally between the two pairs of links and having one end pivoted to one link near its attachment to the frame and having the other end pivoted to one link of the other pair near its attachment to the axle.

DONALD W. SHERMAN.